(12) United States Patent
Ray et al.

(10) Patent No.: US 12,726,017 B2
(45) Date of Patent: Sep. 1, 2026

(54) ELECTRICAL ENERGY STORAGE SYSTEM WITH INTEGRATED FAULT WARNING SYSTEM

(71) Applicant: VOLVO TRUCK CORPORATION, Gothenburg (SE)

(72) Inventors: Dripta Ray, Gothenburg (SE); Diego Santos Pereira Netto, Askim (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 18/920,336

(22) Filed: Oct. 18, 2024

(65) Prior Publication Data

US 2025/0149878 A1 May 8, 2025

(30) Foreign Application Priority Data

Nov. 2, 2023 (EP) .................................... 23207343

(51) Int. Cl.
*H02H 7/20* (2006.01)
*B60L 3/00* (2019.01)
(Continued)

(52) U.S. Cl.
CPC ............. *H02H 7/20* (2013.01); *B60L 3/0046* (2013.01); *B60L 3/0069* (2013.01); *B60L 58/18* (2019.02);
(Continued)

(58) Field of Classification Search
None
See application file for complete search history.

(56) References Cited

U.S. PATENT DOCUMENTS 5,683,827 A 11/1997 Yu
2012/0249154 A1* 10/2012 Dao ...................... B60L 3/0069 324/509

(Continued)

FOREIGN PATENT DOCUMENTS

CN 113129542 A 7/2021
EP 2419959 B1 10/2019

(Continued)

OTHER PUBLICATIONS

Extended European Search Report in corresponding European Application No. 23207343.7 dated Jun. 3, 2024 (8 pages).

*Primary Examiner* — Menatoallah Youssef
*Assistant Examiner* — Aqeel H Bukhari
(74) *Attorney, Agent, or Firm* — Jeffri A. Kaminski; Venable LLP

(57) ABSTRACT

An electrical energy storage system has a plurality of electrical energy storage packs each including at least one electrical energy storage cell, the electrical energy storage packs comprising a switch that controls a connection between two ports of the respective electrical energy storage pack. An electrical wire loop forms a closed circuit by connecting the electrical energy storage packs in series at two of their ports. One of the electrical energy storage packs supplies the electrical wire loop with an electric current, and an alarm device electrically is connected to the electrical wire loop to receive the electric current that passes through all electrical energy storage packs of the electrical energy storage system. The alarm device provides an alarm output when the closed circuit is broken.

20 Claims, 4 Drawing Sheets

(51) Int. Cl.

| | |
|---|---|
| ***B60L 58/18*** | (2019.01) |
| ***H01M 10/42*** | (2006.01) |
| ***H01M 10/48*** | (2006.01) |
| ***H02H 5/04*** | (2006.01) |

(52) U.S. Cl.

CPC ....... *H01M 10/425* (2013.01); *H01M 10/482* (2013.01); *H01M 10/488* (2013.01); *H02H 5/04* (2013.01); *H01M 2010/4271* (2013.01); *H01M 2220/20* (2013.01)

(56) References Cited

U.S. PATENT DOCUMENTS

| | | | | |
|---|---|---|---|---|
| 2013/0175999 | A1* | 7/2013 | Thieme ................. | H02J 7/0029 320/136 |
| 2015/0042491 | A1* | 2/2015 | Burnison ............... | B60Q 9/008 340/902 |
| 2016/0276854 | A1 | 9/2016 | Lian | |
| 2017/0292982 | A1* | 10/2017 | Aceña ................... | B60L 3/0069 |
| 2022/0311257 | A1 | 9/2022 | Lai et al. | |
| 2023/0059046 | A1 | 2/2023 | Khozikov et al. | |

FOREIGN PATENT DOCUMENTS

| | | | |
|---|---|---|---|
| GB | 2534314 | A | 7/2016 |
| JP | H10262330 | A | 9/1998 |
| WO | 21143747 | A1 | 7/2021 |

* cited by examiner

ELECTRICAL ENERGY STORAGE SYSTEM WITH INTEGRATED FAULT WARNING SYSTEM

TECHNICAL FIELD

The disclosure relates generally to electrical energy storage systems. In particular aspects, the disclosure relates to an electrical energy storage system with integrated fault warning system. The disclosure can be applied to heavy-duty vehicles, such as trucks, buses, and construction equipment, among other vehicle types such as marine vessels. The disclosure can be applied to stationary applications. Although the disclosure may be described with respect to a particular vehicle, the disclosure is not restricted to any particular vehicle.

BACKGROUND

Electrical energy storages are playing a pivotal role in electrification of transport solutions as well as stationary electrical energy storage solutions. Electrical energy storages may include multiple electrical energy storage packs which may store large amounts of energy. Faults such a thermal runaway events may lead to hazardous events such a fire. For increased safety, it is therefore important to monitor the condition of the electrical energy storage packs and provide suitable warnings in the event of detected potentially risky conditions of the electrical energy storage packs.

SUMMARY

According to a first aspect of the disclosure, there is provided an electrical energy storage system comprising: a plurality of electrical energy storage packs each including at least one electrical energy storage cell, the electrical energy storage packs comprising a switch that controls a connection between two ports of the respective electrical energy storage pack, an electrical wire loop forming a closed circuit by connecting the electrical energy storage packs in series at their ports, one of the electrical energy storage packs is configured to supply the electrical wire loop with an electric current, and an alarm device electrically connected to the electrical wire loop to receive the electric current that passes through all electrical energy storage packs of the electrical energy storage system, wherein, the alarm device is configured to provide an alarm output when the closed circuit is broken.

The first aspect of the disclosure may seek to provide a hardwired solution to detect faults in multiple electrical energy storage packs with reduced need for wiring. A technical benefit may include a less complicated wiring scheme with fewer wires in the electrical energy storage system.

Optionally in some examples, including in at least one preferred example, the system may comprise the electrical energy storage packs each comprise a control circuit that is configured to keep the respective switch closed as long as the electrical energy storage packs are in a normal operating state. A technical benefit may include an integrated system where the packs control their own switch based on its status.

Optionally in some examples, including in at least one preferred example, the control circuits may be configured to open the respective switch in response to a detected fault in the respective electrical energy storage pack. A technical benefit may include direct response of the warning once a fault is detected. For example, a fault detection system in the electrical energy storage packs may be a thermal runaway detection system based on measuring for example temperature, isolation, pressure, pressure spikes, etc.

Optionally in some examples, including in at least one preferred example, the electrical energy storage packs may be configured to monitor themselves for faults related to thermal rising, wherein the control circuits open the switches when a thermal rising related fault is detected. A technical benefit may include efficient detection of thermal runaway events in the electrical energy storage packs.

Optionally in some examples, including in at least one preferred example, wherein the switches of the electrical energy storage packs may be configured to provide galvanic separation between the electrical energy storage packs. A technical benefit may include reduced risk of grounding issues between the electrical energy storage packs.

For example, the switches of the electrical energy storage packs may include optocouplers. Furthermore, the switches may further include a transistor that is connected to control the state of the optocoupler.

Optionally in some examples, including in at least one preferred example, the alarm device may be electrically connected in series with the electrical energy storage packs in the electrical wire loop. A technical benefit may include simple installation of the system.

Optionally in some examples, including in at least one preferred example, the electric current is a continuous electric current or a pulse train. A continuous electric current is a simple and relatively straight forward solution since the constant current easily provided by an electrical energy storage pack. Using a pulse train may allow for periodic probing of the electrical energy storage packs which may reduce the energy consumption of the electrical energy storage pack that supplies the current.

Optionally in some examples, including in at least one preferred example, the alarm device may be configured to provide at least one of audio, visual, or message-based warning as an output. A benefit is that a clear warning may be provided depending on the circumstances. Thus, the system is open for many different types of warnings.

Optionally in some examples, including in at least one preferred example, the alarm device may be configured to provide a warning output to a surrounding vehicle or infrastructure via wireless communication. A technical benefit may include that the warning may reach further from the location of the electrical energy storage system and thus reach more people.

Optionally in some examples, including in at least one preferred example, the alarm device may comprise a switching circuitry configured to sense the presence of the electric current in the loop, the electric current is received at an input port of the alarm device and transferred via the switching circuitry to a port of the alarm device. That is, a tailored switching circuitry of the alarm device efficiently detects or monitors the electric current in the electric wire loop. The switching circuitry of the alarm device may comprise an optocoupler.

Optionally in some examples, including in at least one preferred example, the electrical energy storage packs each comprise at least three ports, wherein a first and a second port are used for forming the closed circuit in all electrical energy packs except the electrical energy pack that supplies the electrical wire loop with the electric current, and the first port and a third port of the electrical energy pack that supplies the electrical wire loop with the electric current are used for forming the closed circuit. A technical benefit may include that each electrical energy storage pack except the one providing the current, is connected to the closed circuit in the same way, providing for simple installation.

Optionally in some examples, including in at least one preferred example, the electrical energy storage packs comprise at least five ports, wherein a fourth and a fifth port of the electric energy storage pack that supplies the electric current to the electric wire loop are shorted to each other. A technical benefit may include that the electric energy storage pack that provides the electric current to the electric wire loop is easily configured by shoring to ports using for example a jumper. Furthermore, an additional technical benefit may include that all electrical energy storage packs may be identical with regards to their ports.

There is further provided a vehicle comprising the electrical energy storage system according to the first aspect.

According to a second aspect of the disclosure, there is provided a method, comprising: detecting an electric current in an electrical wire loop forming a closed circuit including a plurality of electrical energy storage packs connected in series at two of their ports, the flow of electric current in the wire loop depends on the state of switches in the electrical wire loop that are arranged in each of the electrical energy storage packs, and, providing an alarm output when the closed circuit is broken by any one of the switches.

The second aspect of the disclosure may seek to provide a method to detect faults in multiple electrical energy storage packs with reduced need for wiring. A technical benefit may include a less complicated wiring scheme with fewer wires in the electrical energy storage system.

Optionally in some examples, including in at least one preferred example, the method may comprise providing the flow of electric current as a constant flow of electric current. A technical benefit may include that a continuous electric current is a simple and relatively straight forward solution since the constant current is easily provided by an electrical energy storage pack.

Optionally in some examples, including in at least one preferred example, the method may comprise providing the flow of electric current as an on-demand pulse train of electric current. A technical benefit may include that using a pulse train may allow for periodic probing of the electrical energy storage packs which may reduce the energy consumption of the electrical energy storage pack that supplies the current.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

There are also disclosed herein computer systems, control units, code modules, computer-implemented methods, computer readable media, and computer program products associated with the above discussed technical benefits.

BRIEF DESCRIPTION OF THE DRAWINGS

Examples are described in more detail below with reference to the appended drawings.

DETAILED DESCRIPTION

The detailed description set forth below provides information and examples of the disclosed technology with sufficient detail to enable those skilled in the art to practice the disclosure.

Faults in an electrical energy storage system may lead to thermal runaway events that may cause a hazardous situation including fire. Therefore, the condition of electrical energy storage systems is typically monitored to continuously assess their health. A warning system associated with the electrical energy storage system provides a warning in case a deviating and potentially harmful condition of the electrical energy storage system is detected.

Most electrical energy storage systems comprise multiple electrical energy storage packs. Each of them must m be monitored which requires a means for communication between each electrical energy storage pack and a warning system. On solution may be hardwiring each of the electrical energy storage packs to the warning system. However, this leads to a vast amount of wires which is undesirable due to for example the complexity of such a solution, complicated and time-consuming installation, and unnecessary use of resources. The embodiments described herein provides reduced amount of wiring while still providing a hardwired solution.

Figure 1:
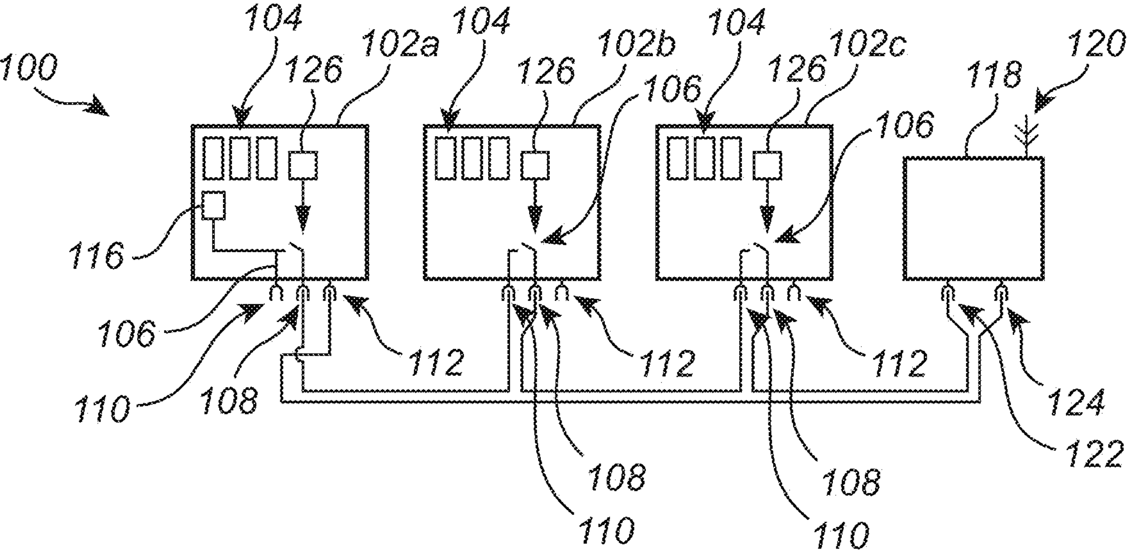
FIG. 1 is an exemplary electrical energy storage system according to an example.

FIG. 1 is an exemplary electrical energy storage system 100 according to an example. The electrical energy storage system 100 comprises a plurality of electrical energy storage packs 102*a*, 102*b*, 102*c*, each including at least one electrical energy storage cell 104, such as Li-ion cells or cells based on battery technologies.

The electrical energy storage packs 102*a-c* comprises a switch 106 that controls a connection between two ports of the respective electrical energy storage pack 102*a-c*.

The switches 106 in electrical energy storages packs 102*a-c*, controls the connection between a first port 108 and a second port 110. In this example embodiment, each electrical energy storages pack 102*a-c* also comprises a third port 112.

An electrical wire loop 114 forms a closed circuit by connecting the electrical energy storage packs 102*a-c* in series at their ports. The electric wire loop is connected to the first 108 and second 110 ports of the electrical energy storage packs 102*b* and 102*c*.

One of the electrical energy storage packs, here electrical energy storage pack 102*a* is configured to supply the electrical wire loop 114 with an electric current. The electric wire loop 114 is connected to the first 108 and the third 112 ports of the electrical energy storage pack 102*a* that is configured to supply the electrical wire loop 114 with an electric current.

The current is supplied to the first port 108 of the electrical energy storage pack 102*a*, internal to the electrical energy storage pack 102*a* from a source 116. Controlling the switch 106 of electrical energy storage pack 102*a* controls the supply of electric current to the electric wire loop 114.

An alarm device 118 is electrically connected to the electrical wire loop to receive the electric current that passes through all electrical energy storage packs of the electrical energy storage system. The alarm device 118 is configured to provide an alarm output when the closed circuit 114 is broken.

The alarm device 118 may be configured to provide at least one of audio, visual, or message-based warning as an output. For example, alarm device may comprise or be connected to a speaker or display from/on which a warning signal may be output.

Furthermore, the alarm device may be configured to provide a warning output to a surrounding vehicle or infrastructure via wireless communication 120.

The electric wire loop 114 is formed by a wire or set wires that connect the electrical energy storage packs 102*a-c* in series at their ports. Furthermore, the alarm device is also electrically connected in series with the electrical energy storage packs 102*a-c* in the electrical wire loop 114. The alarm device 118 is electrically connected in series with the electrical energy storage packs using two ports 122, 124 of the alarm device 118. Thus, a first port 122 and a second port 124 of the alarm device 118.

In the presently described embodiment, the electrical energy storage packs 102*a-c* comprise three ports 108, 110, 112. The first 108 and the second port 110 are used for forming the closed circuit 114 in all electrical energy packs 102*b-c* except the electrical energy storage pack 102*a* that supplies the electrical wire loop 114 with the electric current. Instead, in the electrical energy pack 102*a* that supplies the electric current to the electrical wire loop 114, the first port 108 and the third port 112 of are used for forming the closed circuit 114. The three ports first 108, second 110, and third 112 are three physically different ports of the electrical energy packs 102*a-c*.

The switches 106 in FIG. 1 are depicted in their open state, thus no electric current flows in the electrical wire loop 114. In the operation state of the electrical energy storage system 100, the switches 106 are closed so that electrical current can flow in the electrical wire loop through all the electrical energy storage packs 102*a-c*. Once a fault in one of the electrical energy storage packs 102*a-c* is detected, the switch 106 in that electrical energy storage pack 102*a-c* is opened, the closed circuit is broken, and the flow of electric current is stopped. Once the absence of electrical current is detected by the alarm device 118, an alarm output is provided by the alarm device 118. The electrical energy storage packs 102*a-c* are configured to monitor themselves for faults related to thermal rising. In response to detecting a thermal rising event, the switches 106 are opened.

Advantageously, the electrical energy storage packs 102*a-c* may all comprise a control circuit 126 that is configured to keep the respective switch 106 closed as long as the electrical energy storage packs 102*a-c* are in a normal operating state. For example, such a control circuit, e.g., a management unit in the respective pack 102*a-c* may be configured for: thermal runway detection based on for example temperature measurement, isolation measurements, pressure inside the pack, pressure spikes, or based on detecting gas indicating thermal rising using a gas sensor. The control circuits 126 are configured to open the respective switch in response to a detected fault in the respective electrical energy storage pack 102*a-c*.

Figure 2:
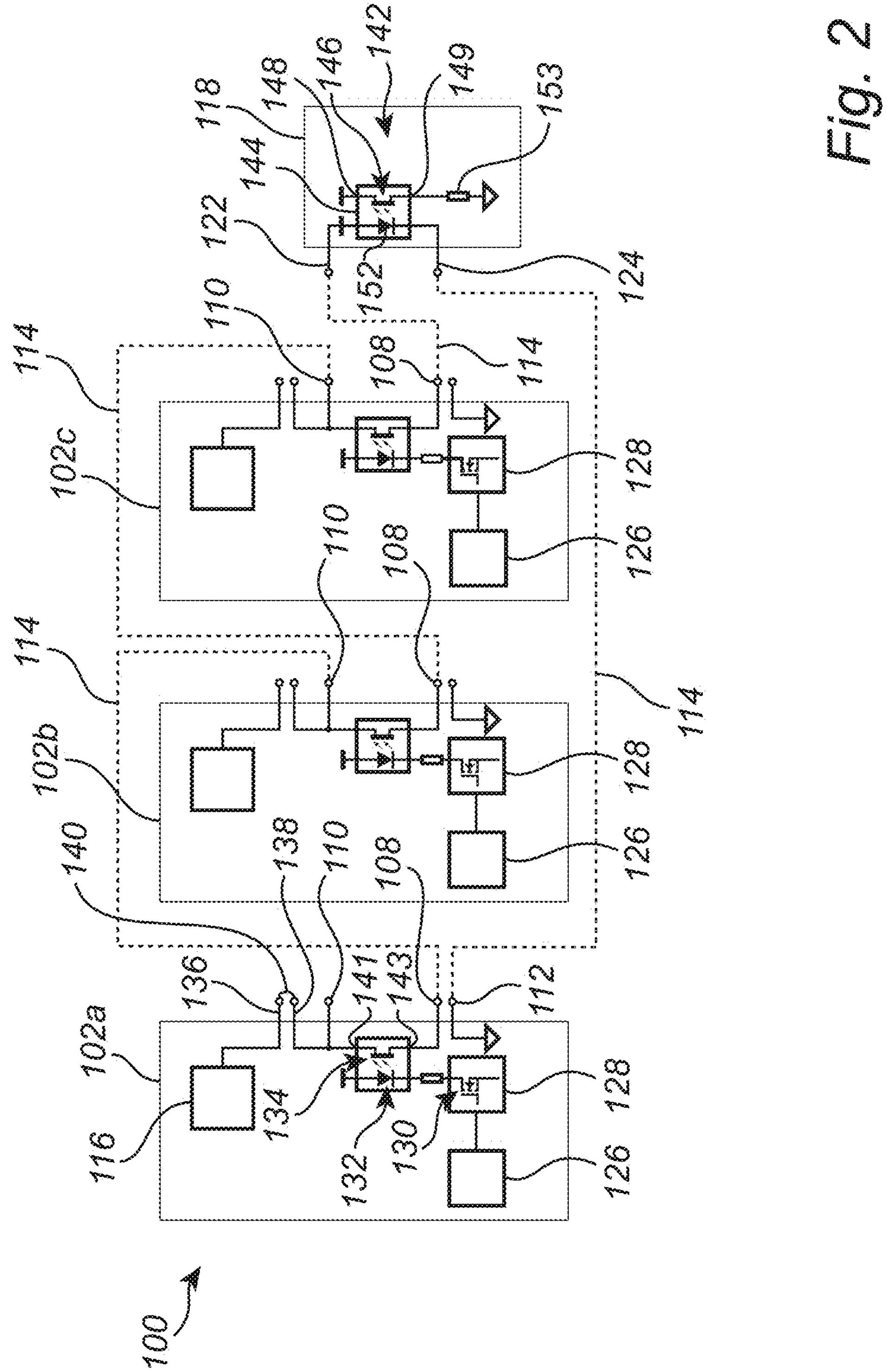
FIG. 2 is an exemplary electrical energy storage system according to an example.

FIG. 2 illustrates an electrical energy storage system 100 according to one example.

The switches 106 are provided as optocouplers 106 that are configured to provide galvanic separation between the electrical energy storage packs 102*a-c*. The optocouplers 106 are connected between the first 108 and second 110 ports of the electrical energy storage packs 102*a-c*. The state of the optocoupler 106, whether it's open or closed determines whether an electric current can flow from one of the first 108 and second 110 ports on one electrical energy storage pack to the other one of the first 108 and second 110 ports of the same electrical energy storage pack.

Furthermore, a circuit 128 comprises semiconductor switch such as a transistor 130, e.g., a mosfet, is connected to control the state of the optocoupler 106. If the transistor allows electric current to flow to the optocoupler 106, the diode 132 of the optocoupler emits light so that the transistor 134 of the optocoupler changes state, e.g., from closed to open. The circuit 128 comprising the transistor 130 is controlled by the control circuit 126.

The electrical energy storage packs 102*a-c* comprise five ports, wherein a fourth 136 and a fifth port 138 of the electric current supplying electric energy storage pack 102*a* are shorted to each other. In this case a jumper 140 shorts the fourth 136 and a fifth port 138. This provides for a simple way of defining which electric energy storage pack 102*a* provides the electric current to the loop 114.

When the jumper 140, or any other device or internal connection, connects the forth 136 and fifth 138 ports, the source 116 connects to the first side 141 of the optocoupler 106. This means that when the optocoupler 106 is in the closed state, electric current is supplied from the source 116, through the optocoupler 106 to its second side 143 and to the first port 108 which is connected to the electric wire loop 114. If a fault is detected in the electric energy storage pack 102*a* that provides the electric current, the optocoupler 106 is opened so that the electric current flow from the source 116 to the first port 108 is prevented.

The electric current is preferably a continuous electric current. However, it is envisaged that a logic circuit may provide a pulse of current from the source 100 as a way of probing the electrical energy storage packs 102*a-c* for faults. If the alarm device 118 does not receive and sense the pulse, an alarm out is provided.

The alarm device 118 comprises a switching circuitry 142 configured to sense the presence of the electric current in the loop 114. The alarm device 118 comprises the first port 122 at which the electric current is received from the electric current loop 114. The first port 122 may thus be considered an input port. The electric current is transferred via the switching circuitry 142 to the second port 124 of the alarm device 118. The second port 124 is connected to the electric wire loop 114.

Preferably, the switching circuitry 142 of the alarm device 118 comprises an optocoupler 144. As long as the electric current is supplied from the electric wire loop, thus, as long as the closed circuit is maintained, the optocoupler remains in a closed state in which a current can flow through the transistor 146 of the optocoupler 144, from a first side 148 to a second side 149. Once the closed circuit 114 is broken, no current is supplied to the diode 152 of the optocoupler 144, and consequently no electric current can flow through the open transistor 146. The absence of this electric current through the open transistor 146 is thus an indication that the closed circuit 114 is broken. In response, the alarm device 118 provides an alarm output. The presence of the current through the transistor 146 of the optocoupler 144 may be sensed by measuring a voltage across a resistor 153 connected to output at the second side 149 of the optocoupler 144.

The alarm device 118 may include a speaker to provide a sound warning, or the alarm device may be connected to a cluster of a vehicle to display a warning. In some embodiments, the alarm output may be provided to an electronic control unit (ECU) of a vehicle employing the electrical energy storage system 100 to trigger warnings such as even SOS depending on the type of warning, for example if the warning relates to thermal runaway or coolant leakage.

In other words, a processing circuitry may monitor the type of warning being issued, so that the alarm device 118 can provide an alarm output of a certain type depending on the warning, for example a first output if the warning is for a detected thermal runaway or if the warning is for a detected coolant leakage.

Figure 3:
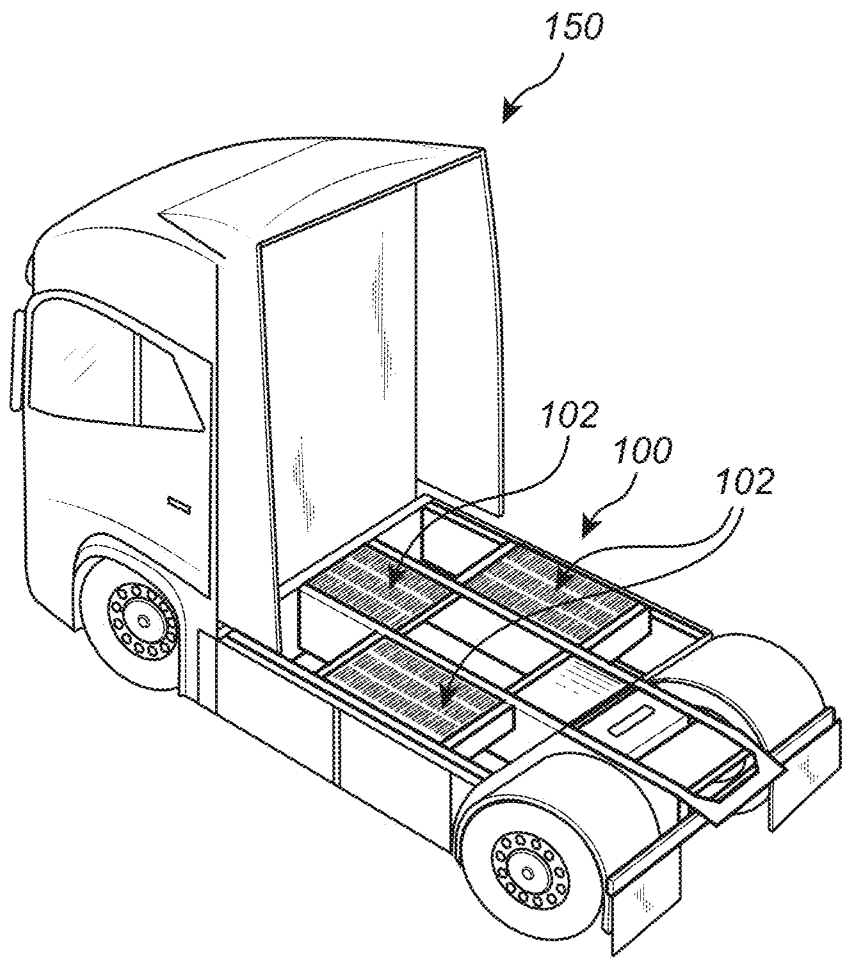
FIG. 3 is an exemplary truck according to an example vehicle.

FIG. 3 is an example vehicle 150 according to embodiments of the present disclosure. The vehicle 150 is here shown as a heavy-duty truck but other types of vehicles are also applicable. The vehicle 100 comprises a hybrid-, or fully electric driveline that is powered by an electrical energy storage system 100 comprising multiple parallel connected electrical energy storage packs 104 as described herein. The electrical energy storage packs 104 comprises a plurality of electrical energy storage cells.

Other example vehicles include light weight trucks, buses, and construction equipment, and marine vessels. The disclosure can be applied to stationary applications.

Figure 4:
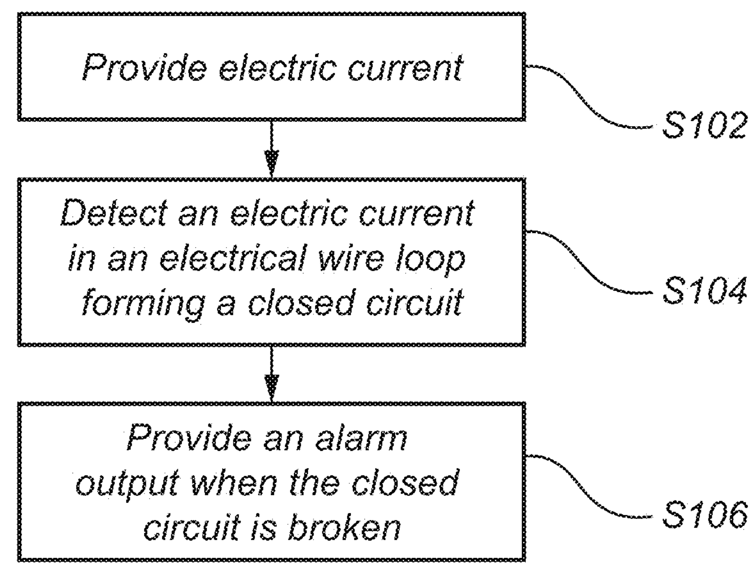
FIG. 4 is a flow-chart of method steps according to an example.

FIG. 4 is a flow-chart of method steps according to example embodiment of the present disclosure.

In step S102, providing an electric current in an electrical wire loop 114 forming a closed circuit including a plurality of electrical energy storage packs 102*a-c* connected in series at two of their ports.

In step S104, detecting the electric current in the electrical wire loop 114. The flow of electric current in the wire loop depends on the state of switches 106 in the electrical wire loop that are arranged in each of the electrical energy storage packs 102*a-c*.

In step S106, providing an alarm output when the closed circuit 114 is broken by any one of the switches 106.

The flow of electric current may preferably be provided as constant flow of electric current.

It is envisaged that the flow of electric current is provided as an on-demand pulse, or pulse train of electric current.

Figure 5:
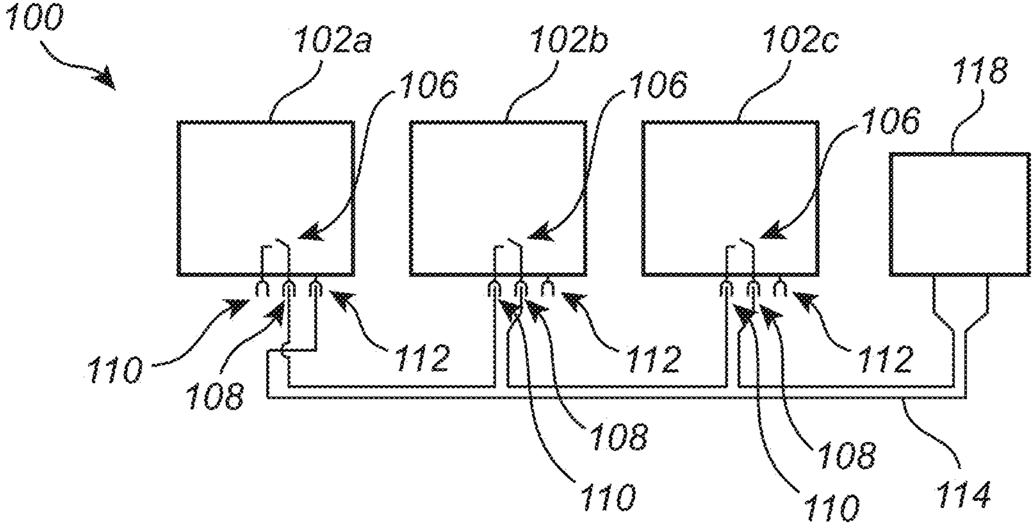
FIG. 5 is another view of FIG. 1, according to an example.

FIG. 5 is another view of FIG. 1, according to an example. FIG. 5 illustrates an electrical energy storage system 100 comprising: a plurality of electrical energy storage packs 102*a-c* each including at least one electrical energy storage cell. The electrical energy storage packs 102*a-c* comprising a switch 106 that controls a connection between two ports 108, 110 of the respective electrical energy storage pack 102*a-c*. An electrical wire loop 114 forming a closed circuit by connecting the electrical energy storage packs 102*a-c* in series at their ports 108, 110, 112. One 102*a* of the electrical energy storage packs is configured to supply the electrical wire loop 114 with an electric current. An alarm device 118 is electrically connected to the electrical wire loop 114 to receive the electric current that passes through all electrical energy storage packs 102*a-c* of the electrical energy storage system 100. The alarm device 118 is configured to provide an alarm output when the closed circuit 114 is broken.

Example 1: An electrical energy storage system comprising: a plurality of electrical energy storage packs each including at least one electrical energy storage cell, the electrical energy storage packs comprising a switch that controls a connection between two ports of the respective electrical energy storage pack, an electrical wire loop forming a closed circuit by connecting the electrical energy storage packs in series at their ports, one of the electrical energy storage packs is configured to supply the electrical wire loop with an electric current, and an alarm device electrically connected to the electrical wire loop to receive the electric current that passes through all electrical energy storage packs of the electrical energy storage system, wherein, the alarm device is configured to provide an alarm output when the closed circuit is broken.

Example 2: The electrical energy storage system of example 1, wherein: the electrical energy storage packs each comprise a control circuit that is configured to keep the respective switch closed as long as the electrical energy storage packs are in a normal operating state.

Example 3: The electrical energy storage system of example 2, wherein: the control circuits are configured to open the respective switch in response to a detected fault in the respective electrical energy storage pack.

Example 4: The electrical energy storage system of any of examples 1-3, wherein the electrical energy storage packs are configured to monitor themselves for faults related to thermal rising, wherein the control circuits open the switches when a thermal rising related fault is detected.

Example 5: The electrical energy storage system of any of examples 1-4, wherein the switches of the electrical energy storage packs are configured to provide galvanic separation between the electrical energy storage packs.

Example 6: The electrical energy storage system of any of examples 1-5, wherein the switches of the electrical energy storage packs include optocouplers.

Example 7: The electrical energy storage system of any of example 6, wherein the switches further include a transistor that is connected to control the state of the optocoupler.

Example 8: The electrical energy storage system of any of examples 1-7, wherein the alarm device is electrically connected in series with the electrical energy storage packs in the electrical wire loop.

Example 9: The electrical energy storage system of example 8, wherein the alarm device is electrically connected in series with the electrical energy storage packs using two ports of the alarm device.

Example 10: The electrical energy storage system of any of examples 1-9, wherein the electric current is a continuous electric current or a pulse train.

Example 11: The electrical energy storage system of any of examples 1-10, wherein the alarm device is configured to provide at least one of audio, visual, or message-based warning as an output.

Example 12: The electrical energy storage system of any of examples 1-11, wherein the alarm device is configured to provide a warning output to a surrounding vehicle or infrastructure via wireless communication.

Example 13: The electrical energy storage system of any of examples 1-12, wherein the alarm device comprises a switching circuitry configured to sense the presence of the electric current in the loop, the electric current is received at an input port of the alarm device and transferred via the switching circuitry to a port of the alarm device.

Example 14: The electrical energy storage system of example 13, wherein the switching circuitry of the alarm device comprises an optocoupler.

Example 15: The electrical energy storage system of any of examples 1-14, wherein: the electrical energy storage packs comprise at least three ports, wherein a first and a second port are used for forming the closed circuit in all electrical energy packs except the electrical energy pack that supplies the electrical wire loop with the electric current, and the first port and a third port of the electrical energy pack that supplies the electrical wire loop with the electric current are used for forming the closed circuit.

Example 16: The electrical energy storage system of example 15, the electrical energy storage packs comprise at least five ports, wherein a fourth and a fifth port of the electric energy storage pack that supplies the electric current to the electric wire loop are shorted to each other.

Example 17: A vehicle comprising the electrical energy storage system according to any of examples 1-16.

Example 18: A method, comprising: detecting an electric current in an electrical wire loop forming a closed circuit including a plurality of electrical energy storage packs connected in series at two of their ports, the flow of electric current in the wire loop depends on the state of switches in the electrical wire loop that are arranged in each of the electrical energy storage packs, and, providing an alarm output when the closed circuit is broken by any one of the switches.

Example 19: The method of example 18, comprising: providing the flow of electric current as a constant flow of electric current.

Example 20: The method of example 18, comprising: providing the flow of electric current as an on-demand pulse train of electric current.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. An electrical energy storage system comprising:

a plurality of electrical energy storage packs each including at least one electrical energy storage cell, each of the electrical energy storage packs comprising a switch that controls a connection between two ports of the respective electrical energy storage pack, an electrical wire loop forming a closed circuit by connecting the plurality of electrical energy storage packs in series at two of their ports, a first one of the plurality of electrical energy storage packs is configured to supply the electrical wire loop with an electric current, and an alarm device electrically connected to the electrical wire loop to receive the electric current that passes through all electrical energy storage packs of the electrical energy storage system, wherein, the alarm device is configured to provide an alarm output when the closed circuit is broken.

2. The electrical energy storage system of claim 1, wherein:

the electrical energy storage packs each comprise a control circuit that is configured to keep the respective switch closed as long as the electrical energy storage packs are in a normal operating state.

3. The electrical energy storage system of claim 2, wherein:

the control circuits are configured to open the respective switch in response to a detected fault in the respective electrical energy storage pack.

4. The electrical energy storage system of claim 1, wherein the electrical energy storage packs are configured to monitor themselves for faults related to thermal rising, wherein the control circuits open the switches when a thermal rising related fault is detected.

5. The electrical energy storage system of claim 1, wherein the switches of the electrical energy storage packs are configured to provide galvanic separation between the electrical energy storage packs.

6. The electrical energy storage system of claim 1, wherein the switches of the electrical energy storage packs include optocouplers.

7. The electrical energy storage system of claim 6, wherein the switches further include a transistor that is connected to control the state of the optocoupler.

8. The electrical energy storage system of claim 1, wherein the alarm device is electrically connected in series with the electrical energy storage packs in the electrical wire loop.

9. The electrical energy storage system of claim 8, wherein the alarm device is electrically connected in series with the electrical energy storage packs using two ports of the alarm device.

10. The electrical energy storage system of claim 1, wherein the electric current is a continuous electric current or a pulse train.

11. The electrical energy storage system of claim 1, wherein the alarm device is configured to provide at least one of audio, visual, or message-based warning as an output.

12. The electrical energy storage system of claim 1, wherein the alarm device is configured to provide a warning output to a surrounding vehicle or infrastructure via wireless communication.

13. The electrical energy storage system of claim 1, wherein the alarm device comprises a switching circuitry configured to sense the presence of the electric current in the loop, the electric current is received at an input port of the alarm device and transferred via the switching circuitry to a port of the alarm device.

14. The electrical energy storage system of claim 13, wherein the switching circuitry of the alarm device comprises an optocoupler.

15. The electrical energy storage system of claim 1, wherein:

the electrical energy storage packs comprise at least three ports, wherein a first and a second port are used for forming the closed circuit in all electrical energy storage packs except the electrical energy pack that supplies the electrical wire loop with the electric current, and the first port and a third port of the electrical energy storage pack that supplies the electrical wire loop with the electric current are used for forming the closed circuit.

16. The electrical energy storage system of claim 15, the electrical energy storage packs comprise at least five ports, wherein a fourth and a fifth port of the electrical energy storage pack that supplies the electric current to the electric wire loop are shorted to each other.

17. A vehicle comprising the electrical energy storage system according to claim 1.

18. A method, comprising:

detecting an electric current in an electrical wire loop forming a closed circuit including a plurality of electrical energy storage packs connected in series at two of their ports, the flow of electric current in the wire loop depends on the state of switches in the electrical wire loop that are arranged in each of the electrical energy storage packs, and, providing an alarm output when the closed circuit is broken by any one of the switches.

19. The method of claim 18, further comprising:

providing the flow of electric current as a constant flow of electric current.

20. The method of claim 18, further comprising:

providing the flow of electric current as an on-demand pulse train of electric current.

* * * * *